US011492819B2

(12) United States Patent
Donnenfeld

(10) Patent No.: US 11,492,819 B2
(45) Date of Patent: Nov. 8, 2022

(54) BARRIER SYSTEM AND METHOD

(71) Applicant: Gregg Reed Donnenfeld, Roslyn, NY (US)

(72) Inventor: Gregg Reed Donnenfeld, Roslyn, NY (US)

(*) Notice: Subject to any disclaimer, the term of this patent is extended or adjusted under 35 U.S.C. 154(b) by 324 days.

(21) Appl. No.: 16/853,605

(22) Filed: Apr. 20, 2020

(65) Prior Publication Data

US 2021/0324654 A1 Oct. 21, 2021

(51) Int. Cl.
| | | |
|---|---|---|
| *B01D 46/00* | (2022.01) | |
| *B01D 46/10* | (2006.01) | |
| *A47C 7/62* | (2006.01) | |
| *E04H 15/06* | (2006.01) | |
| *E04H 15/04* | (2006.01) | |
| *E04H 15/44* | (2006.01) | |
| *A62B 15/00* | (2006.01) | |
| *B60R 99/00* | (2009.01) | |

(52) U.S. Cl.
CPC .............. *E04H 15/06* (2013.01); *A62B 15/00* (2013.01); *B01D 46/0091* (2013.01); *B01D 46/10* (2013.01); *B60R 99/00* (2013.01); *E04H 15/04* (2013.01); *E04H 15/44* (2013.01); *A47C 7/62* (2013.01)

(58) Field of Classification Search
CPC .. B01D 46/10; B01D 46/0091; A61G 7/0526; A61G 10/02; A61G 10/005; A62B 15/00; A47C 21/08; A47C 29/003
USPC .................................. 55/385.3, 472; 95/273
See application file for complete search history.

(56) References Cited

U.S. PATENT DOCUMENTS

| | | | |
|---|---|---|---|
| 10,987,440 B1* | 4/2021 | Sood | H05B 47/115 |
| 2004/0020363 A1* | 2/2004 | LaFerriere | B01D 46/0028 55/472 |
| 2004/0031248 A1* | 2/2004 | Lindsay | F24F 8/10 55/385.3 |
| 2012/0024154 A1* | 2/2012 | Augustine | A61M 16/06 95/273 |
| 2021/0298973 A1* | 9/2021 | Barbosa | A61G 10/02 |
| 2021/0307985 A1* | 10/2021 | Staab | A61G 12/00 |
| 2021/0353981 A1* | 11/2021 | Gray, III | B01D 39/1623 |

* cited by examiner

*Primary Examiner* — Minh Chau T Pham
(74) *Attorney, Agent, or Firm* — Carlson, Gaskey & Olds, P.C.

(57) ABSTRACT

A retractable barrier that helps prevent the spread of communicable disease includes a first outer surface that faces a first direction, a second outer surface that faces a second direction opposite the first direction, and a filter layer between the first outer surface and the second outer surface. The filter layer includes a particulate filtering material. The barrier is selectively extendable from a compartment to establish a partition that separates individuals on opposite sides of the partition.

21 Claims, 7 Drawing Sheets

BARRIER SYSTEM AND METHOD

BACKGROUND

In late 2019, an infectious disease known as COVID-19 or coronavirus began infecting people in Wuhan, China. The disease spread globally rapidly resulting in a pandemic recognized by the World Health Organization (WHO) in March 2020. In particular, disease caused by the virus is believed to be spread by people who are in close contact with one another and droplets that may be associated with sneezing, coughing, or even talking. Although it is believed that people showing symptoms of the disease are contagious, the virus is also believed to be spread by asymptomatic individuals. Countries throughout the world including China, Italy, Spain, and the United States, among others, have instituted lockdowns and stay-at-home restrictions to keep people from spreading the disease. The lockdowns and stay-at-home restrictions were instituted to help slow the spread of coronavirus and ensure that healthcare systems have capacity to assist patients who need to be hospitalized and who are suffering the most acute symptoms.

People who leave their homes to obtain essential supplies such as food and medicine are required to social distance and maintain a particular distance from other people. Businesses that are not essential businesses such as restaurants, bars, gyms, libraries, and schools have shut down throughout the world. Sports leagues throughout the world have canceled seasons and postponed events indefinitely. Concerts and other performances have been postponed indefinitely. The financial and social impacts are staggering.

It is believed that a vaccine may not be available for twelve to eighteen months. People will be unable to remain in their homes and maintain social distancing until the vaccine is available. Businesses, public venues, and public buildings will have to adjust.

It is with these issues in mind, among others, that various aspects of the disclosure were conceived.

SUMMARY

According to one aspect, a barrier system includes an apparatus including a barrier having a first outer surface that faces a first direction, a second outer surface that faces a second direction opposite the first direction, and a filter layer between the first outer surface and the second outer surface comprising a particulate filtering material.

According to another aspect, a method includes receiving, by at least one processor, a first request to extend a barrier from a first position to a second position, extending, by the at least one processor, the barrier from the first position to the second position in response to the first request, receiving, by the at least one processor, a second request to retract the barrier from the second position to the first position, and retracting, by the at least one processor, the barrier from the second position to the first position in response to the second request.

According to an additional aspect, a non-transitory computer-readable storage medium includes instructions stored thereon that, when executed by a computing device cause the computing device to perform operations, the operations including receiving a first request to extend a barrier from a first position to a second position, extending the barrier from the first position to the second position in response to the first request, receiving a second request to retract the barrier from the second position to the first position, and retracting the barrier from the second position to the first position in response to the second request.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
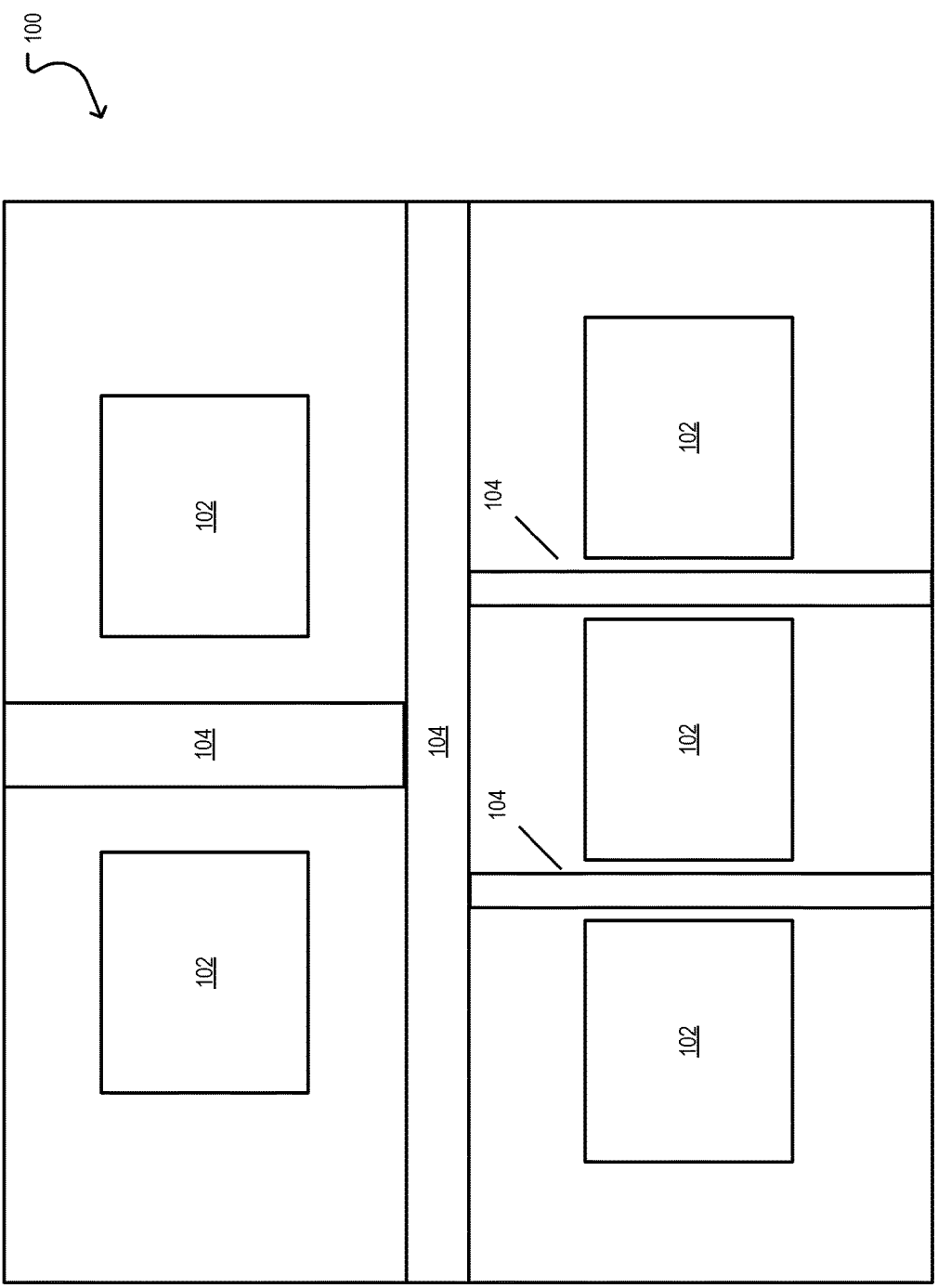
FIG. 1 is a block diagram of a barrier system according to an example embodiment.

Aspects of a barrier system and method includes an apparatus comprising a barrier having a first outer surface that faces a first direction, a second outer surface that faces a second direction opposite the first direction, and a filter layer between the first outer surface and the second outer surface comprising a particulate filtering material. The filter layer may meet the U.S. National Institute for Occupational Safety and Health (NIOSH) N95 standard air filtration rating. In addition, the barrier may be a retractable barrier that may be configured to move between a first closed position to a second open position. In addition, the barrier may be housed in a compartment in a vehicle having at least one seat and may be configured to separate or shield a first seat from a second seat in the vehicle. The vehicle may be one of an automobile, a train, or an airplane, among others. In another example, at least the filter layer may be replaceable and the barrier may be portable.

In a further example, the barrier may attach to at least one fastener. The barrier may automatically attach to the at least one fastener and also may automatically detach from the at least one fastener. The barrier may attach to the at least one fastener in response to a request from a computing device. Alternatively, the barrier may attach to the at least one fastener in response to a press of a button displayed by a computing device.

In another example, the barrier is portable and configured to be transported by a user and self-installed to at least one fastener on a ceiling of a vehicle to create at least one partition or compartment in the vehicle. Alternatively, the barrier is portable and configured to be transported by a user and self-installed to at least one fastener on a floor of a vehicle to create at least one partition or compartment in the vehicle. In another example, the barrier is portable and configured to be transported by a user and self-installed to at least one fastener on an armrest of an airplane to create at least one partition or compartment in the airplane.

Many public places and venues in the United States such as public transportation, restaurants, bars, movie theaters, entertainment venues, places of worship, schools, workplaces, offices, and others are designed for people to congregate close to one another. During the 2019-2020 coronavirus pandemic, countries throughout the world including China, Italy, Spain, and the United States have instituted lockdowns and stay-at-home restrictions to keep people from spreading the disease. These public places and venues have shuttered for an indefinite amount of time and suffered extreme hardship. The economic and social disruption has been swift and widespread. Although people are permitted to leave their homes in most instances, the governments throughout the United States and throughout the world have recommended and/or required people to maintain a particular physical distance between people, e.g., at least six feet. Thus, it is not known how or when these public buildings and venues may reopen. In many cases, it is simply not possible or feasible to maintain social distancing without redesigning a venue, vehicle, or building. However, these venues may be outfitted or retrofitted with the barrier system discussed herein.

The barrier may be used to mitigate or prevent the spread of infectious agents such as bacteria, viruses, or "germs" including COVID-19 or coronavirus. The barrier may be used to create one or more compartments, partitions, or sub-sections to shield and isolate people in locations such as vehicles, buildings, or other locations.

As an example, a first person may sit in a front portion of a vehicle such as a taxi and a second person may sit in a rear portion of the vehicle. At least one barrier may be used to create a first compartment for the first person and a second compartment for the second person.

As another example, a first person may sit in a first seat in a row at a movie theater and a second person may sit in a second seat in the row that may be adjacent to the first seat at the movie theater. At least one barrier may be configured between the first seat and the second seat to create a first compartment for the first person and a second compartment for the second person. In addition, a barrier may be located behind each seat and in front of each seat.

As another example, a first person may sit in a first seat in a row at a sports arena and a second person may sit in a second seat in the row that may be adjacent to the first seat at the sports arena. At least one barrier may be configured between the first seat and the second seat to create a first compartment for the first person and a second compartment for the second person. In addition, a barrier may be located behind each seat and in front of each seat.

As another example, a first person may sit in a first seat in a row on an airplane and a second person may sit in a second seat in the row that may be adjacent to the first seat on the airplane. At least one barrier may be configured between the first seat and the second seat to create a first compartment for the first person and a second compartment for the second person. In addition, a barrier may be located behind each seat and in front of each seat.

FIG. 1 shows a block diagram of a barrier system 100 according to an example embodiment. The barrier system 100 includes one or more seats 102 or zones each configured to hold one or more passengers such as a human or animal. The barrier system 100 also includes one or more barriers 104 or shields that are located between the one or more seats 102. The barrier 104 also may be a partition that may be used to create one or more compartments. As an example, the one or more seats 102 may be located in a vehicle.

In one example, the barrier 104 may be constructed of materials including but not limited to a layer of particulate filtering material that meets the U.S. National Institute of Occupational Safety and Health (NIOSH) N95 standard of air filtration. During the 2019-2020 coronavirus pandemic, people have worn personal protective equipment (PPE) such as N95 respirators or masks on their faces to prevent the spread of coronavirus. The face masks may be used to protect a wearer from airborne particles and from airborne transmission. The materials may be a mesh of synthetic polymer fibers that may be nonwoven polypropylene fabric. In addition, the materials associated with the barrier may be replaceable and/or sterilized. In another example, the barrier may be plastic.

The barrier 104 may permit a person to see through the barrier to allow conversation through the material. Thus, the barrier 104 may be transparent or partially transparent. Alternatively, the barrier 104 may be opaque. In one example, the vehicle may be equipped with one or more barriers 104 that are installed at the time of assembly by the manufacturer. In another example, the vehicle may have one or more barriers 104 that are installed after assembly by the manufacturer. The barriers 104 may be installed by an owner or user of the vehicle or the barriers 104 may be installed by a person servicing the vehicle.

The one or more barriers 104 may be configured to compartmentalize or partition one or more seats or zones from other seats, regions, subsets, or zones of the vehicle. One example, one or more barriers 104 may separate a driver or operator of the vehicle from a passenger of the vehicle. One or more barriers 104 may separate a front portion of the vehicle from a rear portion of the vehicle. In addition, one or more barriers may separate a first portion of the vehicle from a second portion of the vehicle such a back left seat or zone from a back right seat or zone.

In a further example, one or more barriers 104 may be used to separate one seat on a transportation vehicle from another seat on the transportation vehicle. The transportation vehicle may be an airplane, a train, or a subway car.

In another example, the one or more barriers 104 may be used to separate one seat or region in a public building or venue from another seat or region in the public building or venue. As an example, the seats may be located in a row in a movie theater, a stadium, or an arena. Alternatively, the seats may be located on a couch, bench, or seat at a retail venue such as a mall, a bus stop, or a subway station, among others. There may be a barrier located between each seat and there may be a barrier in front of and behind each seat.

Each barrier 104 may extend from a storage compartment in the vehicle. The storage compartment may be located in a ceiling of the vehicle or a floorboard of the vehicle. In another example, the storage compartment may be located in a floor of a building between seats or zones for dividing, e.g., seats in an arena or movie theater. In another example, the storage compartment may be located in an armrest of the vehicle such as an armrest on an airplane or a tray table on the airplane.

The barrier 104 may have a device or object that allows a user to extend or open the barrier from a closed position or first state to an open position or second state. The device or object may be a cord, a handle, or a button, among others. The barrier may be fastened in the open position or the closed position using one or more fasteners such as a Velcro fastener, a hook, or another fastening device. In one example, the barrier 104 may automatically attach to the at least one fastener and the barrier also may automatically detach from the at least one fastener. In another example, the button may be displayed by a computing device on a display.

The barrier 104 may be associated with a computing device that includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the at least one computing device 102 further includes at least one communications interface to transmit and receive communications, messages, and/or signals.

The at least one computing device can be a laptop computer, a smartphone, a personal digital assistant, a tablet computer, a standard personal computer, or another processing device. The at least one computing device may include a display, such as a computer monitor, for displaying data and/or graphical user interfaces. The at least one computing device may also include a Global Positioning System (GPS) hardware device for determining a particular location of the computing device, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one computing device may display on the display a graphical user interface (or GUI) to generate a graphical user interface on the display. The graphical user interface may be provided by an application. The graphical user interface enables a user of the at least one computing device to interact with the application.

The application may be a component of an application and/or service executable by the at least one computing device. For example, the application may be a single unit of deployable executable code or a plurality of units of deployable executable code. According to one aspect, the application may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

Figure 2:
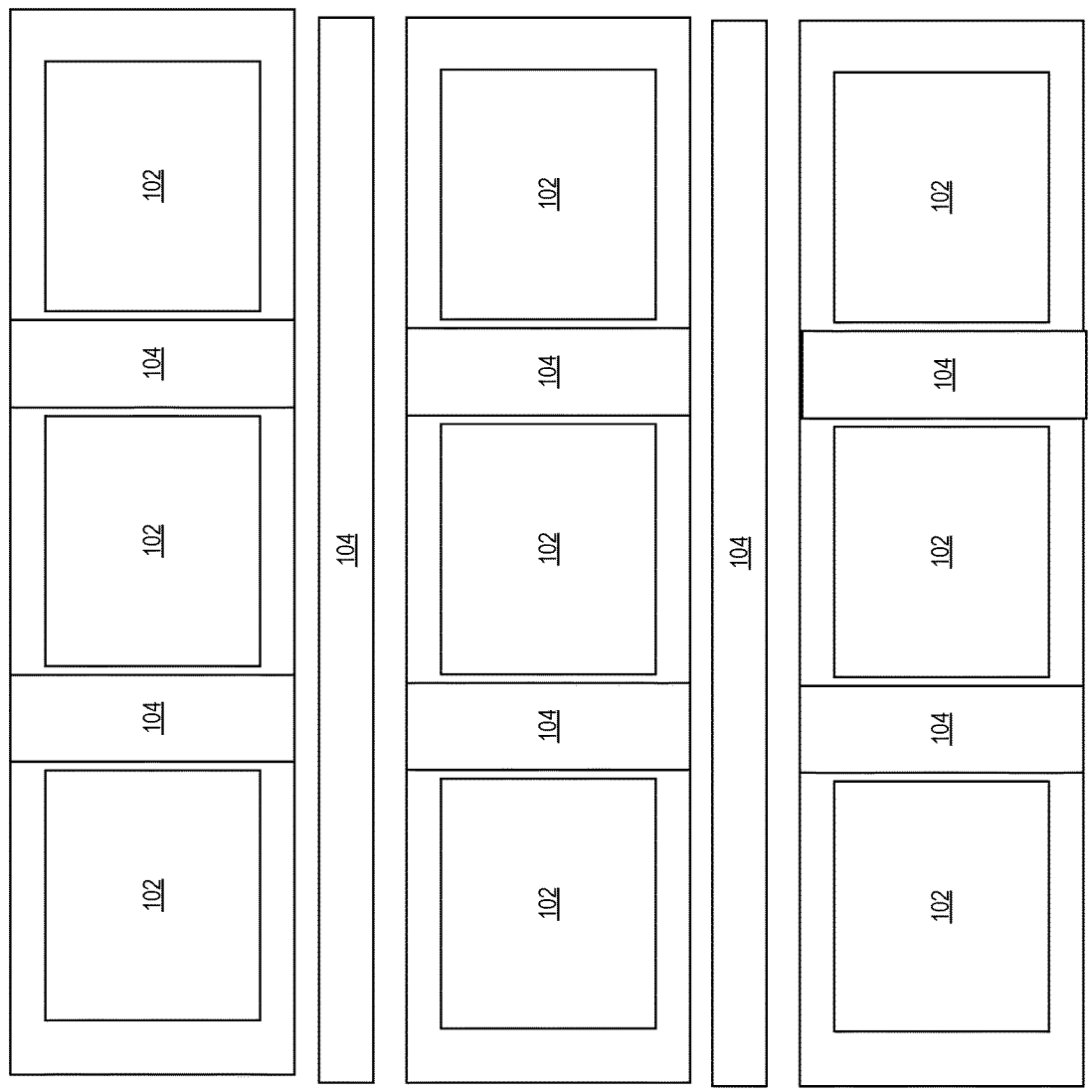
FIG. 2 shows another block diagram of the barrier system according to an example embodiment.

FIG. 2 shows another block diagram of the barrier system 100 according to an example embodiment. As shown in FIG. 2, there may be one or more seats 102, partitions, compartments, or zones that may be arranged in one or more rows. The one or more rows may be located in a building or venue such as a stadium, an arena, a theater, a church, a house of worship, or another venue. Each of the seats 102 may have one or more associated barriers 104 that may protect an occupant that may be seated in the seat.

Figure 3:
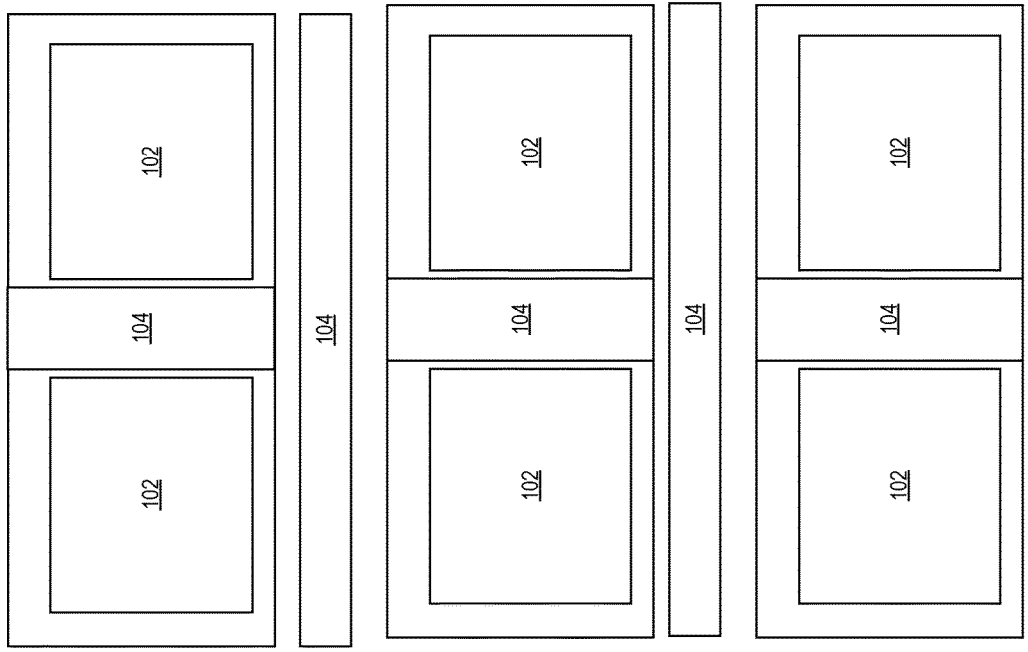
FIG. 3 shows another block diagram of the barrier system according to an example embodiment.
Figure 3:
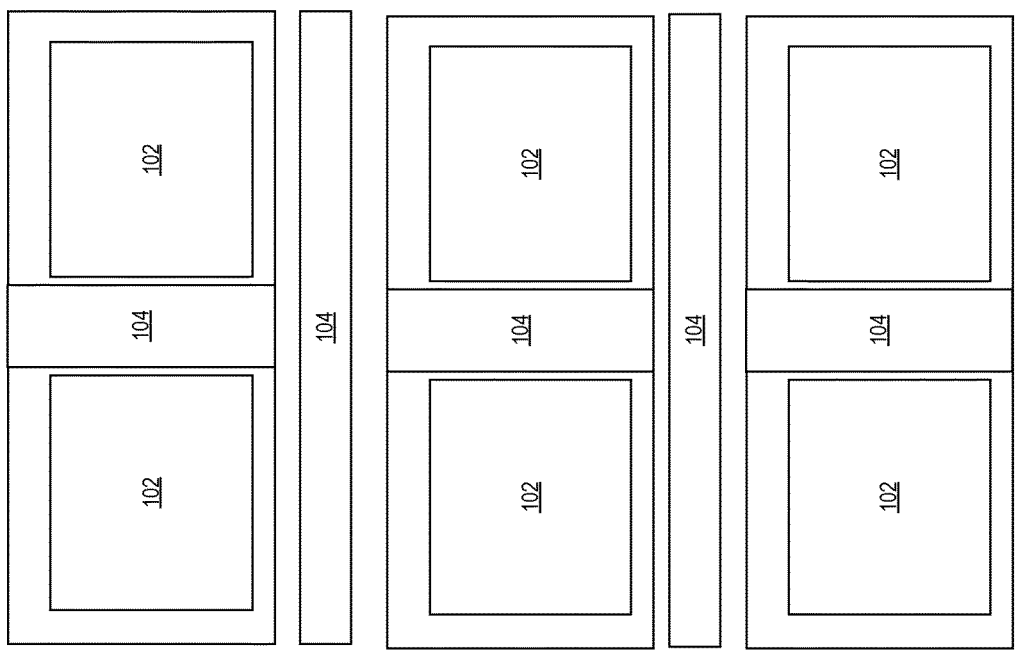

FIG. 3 shows another block diagram of the barrier system 100 according to an example embodiment. As shown in FIG. 3, there may be one or more seats 102, partitions, compartments, or zones that may arranged in one or more rows on a publicly available vehicle such as an airplane, a train, a subway, a bus, or a streetcar. The vehicle may be associated with public transportation. Each of the seats 102 may have one or more associated barriers that may protect an occupant that may be seated in the seat.

Figure 4:
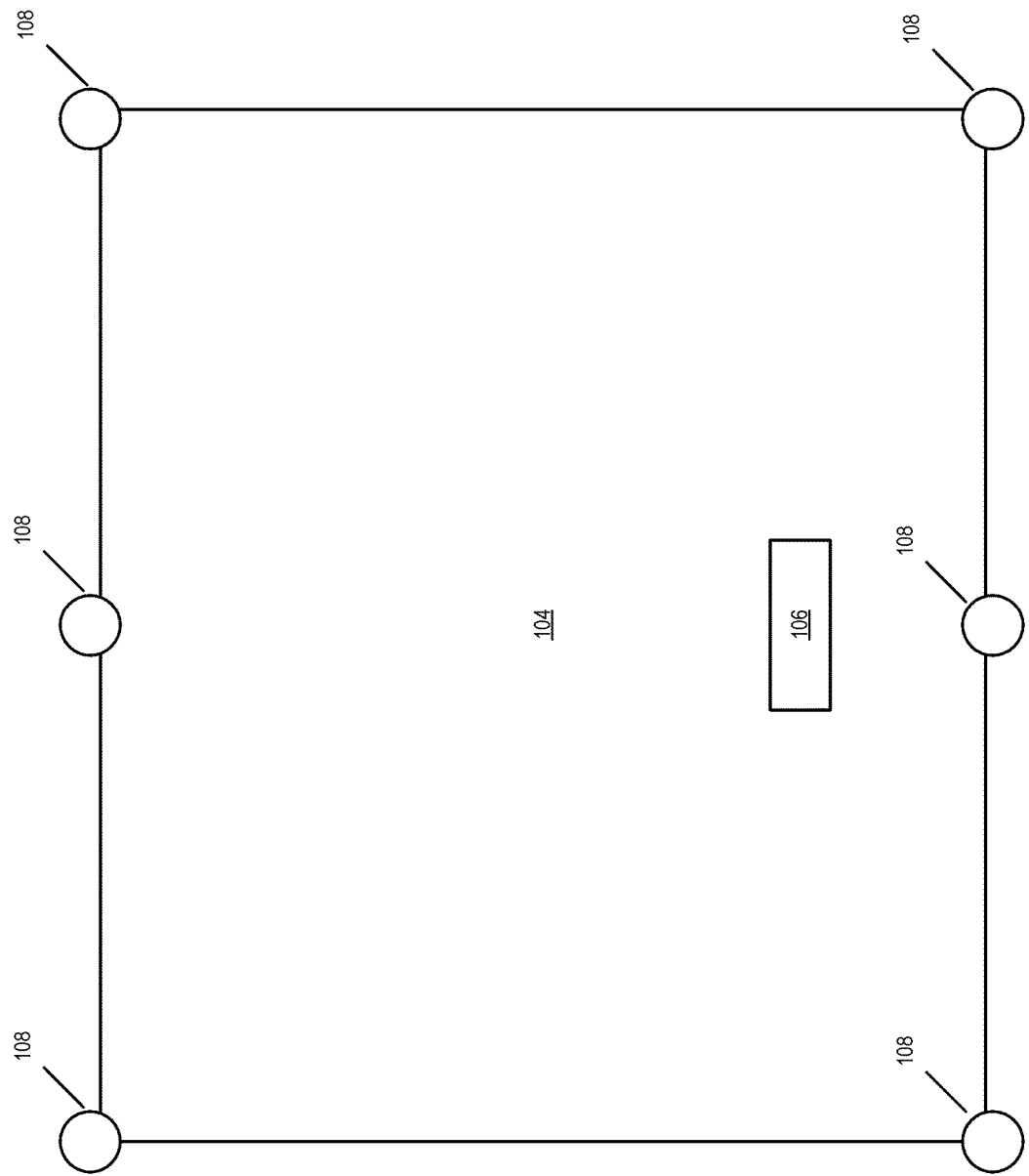
FIG. 4 illustrates a block diagram of the barrier system according to an example embodiment.

FIG. 4 illustrates a block diagram of the barrier system 100 according to an example embodiment. As shown in FIG. 4, the barrier 104 may have one or more handles 106 or devices that may be used by a user to move the barrier 104 from a closed position to an open position or move the barrier from a first state to a second state. As an example, the user may use the handle 106 to move the barrier from the closed position to the open position or move the barrier from the open position to the closed position. In addition, the barrier 104 may be affixed or attached to one or more objects using one or more fasteners 108. The user may attach the barrier 104 to the one or more fasteners 108 or the barrier may automatically attach to the one or more fasteners. In addition, the user may detach the barrier 104 from the one or more fasteners 108 or the barrier may automatically detach from the one or more fasteners.

Figure 5:
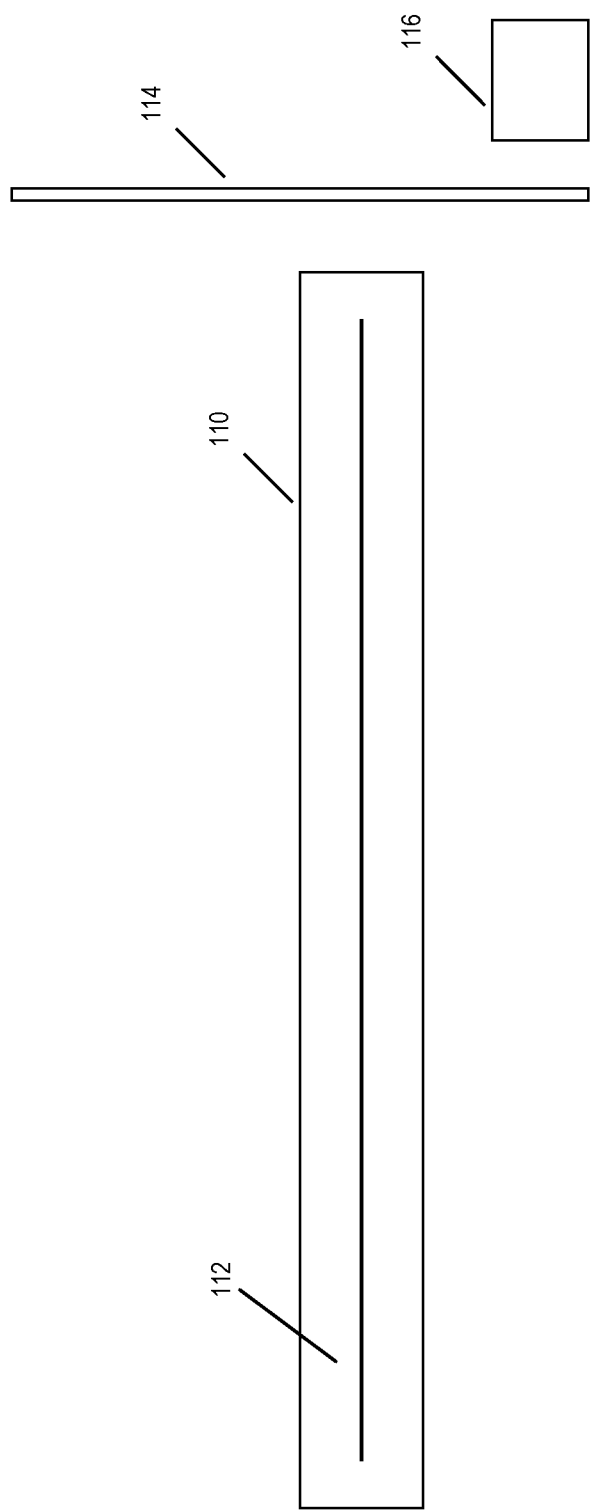
FIG. 5 illustrates another block diagram of the barrier system according to an example embodiment.

FIG. 5 illustrates another block diagram of the barrier system 100 according to an example embodiment. As shown in FIG. 5, the barrier 104 may be stored in a storage compartment 110 when the barrier 104 is not in use. When the barrier 104 is not in use, it may be in a first position or state. The barrier 104 may extend from the storage compartment 110 and exit from an opening 112 that protects the barrier 104 when it is located in the storage compartment 110. The barrier 104 may be activated from the closed position using a lever or rod 114 that may be pulled in a direction by a user. In one example, the user may pull the rod down and the barrier may be activated. Alternatively, the barrier may be activated from the closed position using a button 116 that may be activated or pushed by the user. The barrier may be moved from the open position to the closed position using either the lever or rod 114 or the button 116. As an example, the user may pull the rod down and the barrier may be retracted.

In one example, the button may be displayed on a display of a computing device or may be displayed by the computing device. The button may be a virtual button that is an augmented reality (AR) button. Alternatively, the barrier 104 may be moved from the closed position to the open position or from the open position to the closed position using another mechanism or device.

Figure 6:
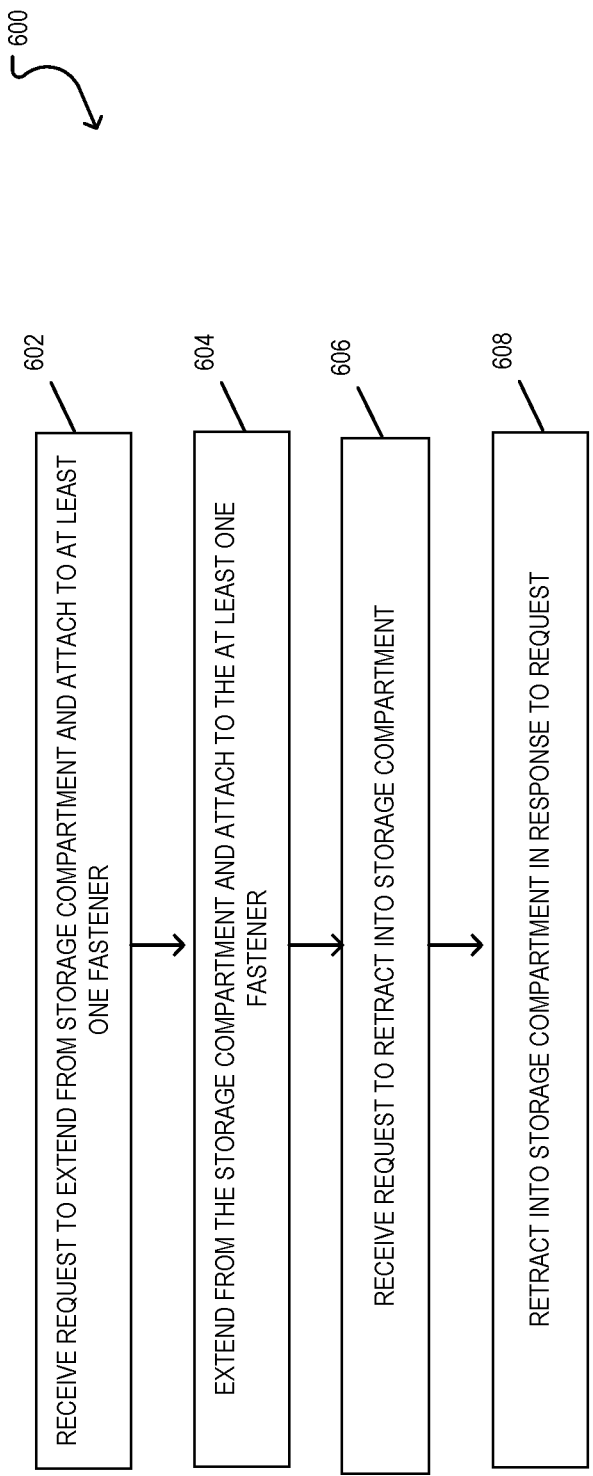
FIG. 6 illustrates a flowchart for extending and retracting the barrier of the barrier system according to an example embodiment.

FIG. 6 illustrates a flowchart of a process 600 for extending and retracting the barrier 104 according to an example embodiment. In step 602, the barrier 104 may receive a request to extend from the storage compartment and move from the first state or closed state to a second state or open state. The barrier 104 may attach to one or more fasteners. A person may attach the barrier to the one or more fasteners or the barrier may automatically attach to the one or more fasteners.

In step 604, the barrier may extend or leave the storage compartment and attach to at least one fastener to transition from the first state or closed state to the second state or open state. In step 606, after the barrier 104 is used and no longer in use, the barrier may receive a request to retract the barrier from the open state to the closed state. In step 608, the barrier may retract from the open state to the closed state into the storage compartment. The person may retract the barrier or the barrier may automatically retract.

Figure 7:
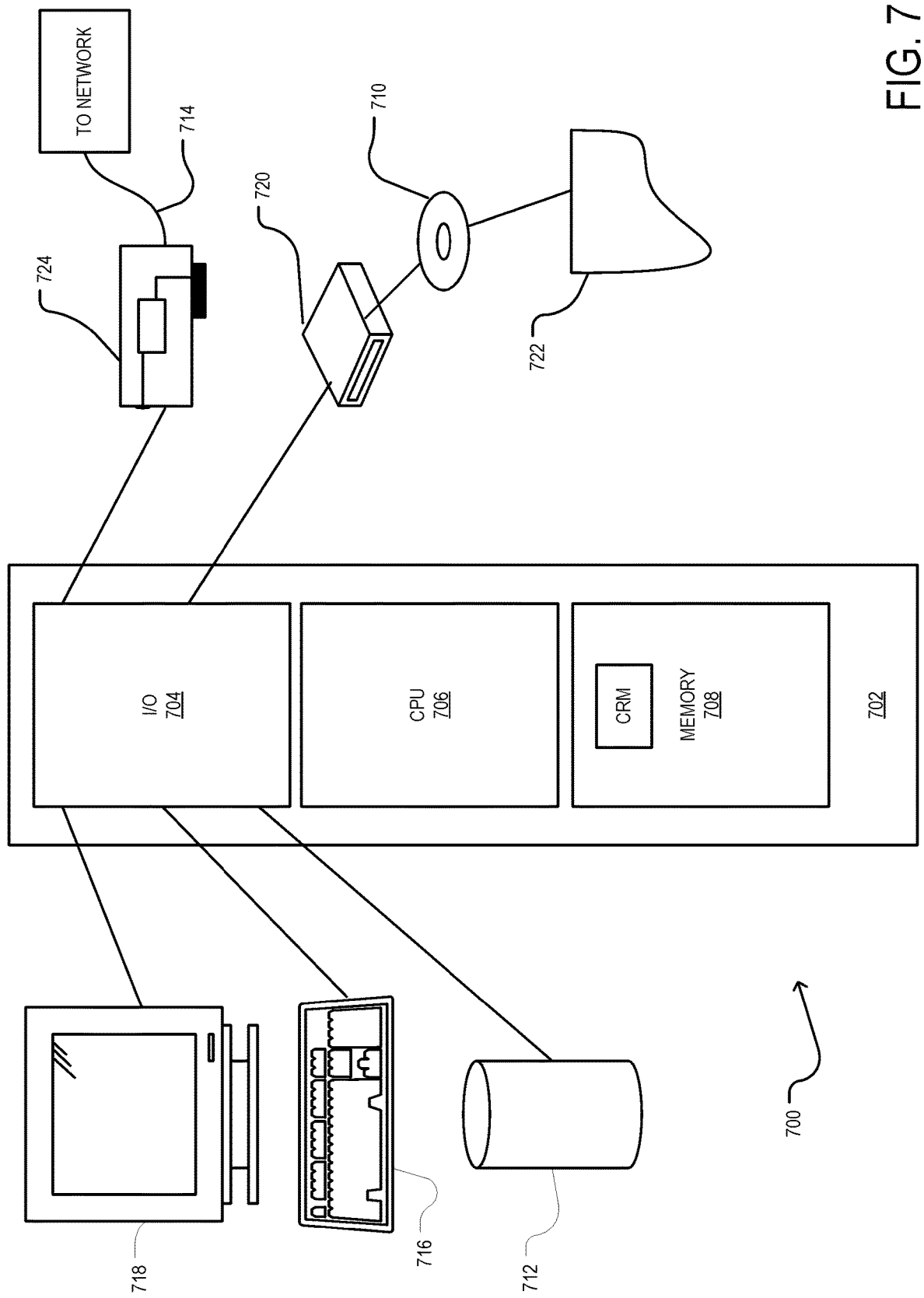
FIG. 7 illustrates a block diagram of a computing device according to an example embodiment.

FIG. 7 illustrates an example computing system 700 that may implement various systems, such as the barrier system 100, and the methods discussed herein, such as process 600. A general purpose computer system 700 is capable of executing a computer program product to execute a computer process. Data and program files may be input to the computer system 700, which reads the files and executes the programs therein. Some of the elements of a general purpose computer system 700 are shown in FIG. 7 wherein a processor 702 is shown having an input/output (I/O) section 704, a central processing unit (CPU) 706, and a memory section 708. There may be one or more processors 702, such that the processor 702 of the computer system 700 comprises a single central-processing unit 706, or a plurality of processing units, commonly referred to as a parallel processing environment. The computer system 700 may be a conventional computer, a server, a distributed computer, or any other type of computer, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other media or mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 704 is connected to one or more user-interface devices (e.g., a keyboard 716 and a display unit 718), a disc storage unit 712, and a disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 704, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by another storage medium drive unit. The network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the computing device, a plurality of internal and external databases, source databases, and/or cached data on servers are stored in memory of the computing device, or other storage systems, such as the disk storage unit 712 or the DVD/CD-ROM medium 710, and/or other external storage devices made available and accessible via a network architecture. The source code executed by the computing device may be embodied by instructions stored on such storage systems and executed by the processor 702.

Some or all of the operations described herein may be performed by the processor 702, which is hardware. Further, local computing systems, remote data sources and/or services, and other associated logic represent firmware, hardware, and/or software configured to control operations of the barrier system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 702 and a user may interact with a Graphical User Interface (GUI) using one or more user-interface devices (e.g., the keyboard 716, the display unit 718, and the user devices 704) with some of the data in use directly coming from online sources and data stores. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
   a barrier configured to establish a partition that at least partially separates an individual on a first side of the barrier from another individual on a second, opposite side of the barrier, the barrier including a first outer surface that faces a first direction toward the first side, a second outer surface that faces a second direction opposite the first direction toward the second side, and a filter layer comprising a particulate filtering material between the first outer surface and the second outer surface;
   a compartment configured to at least partially receive the barrier; and
   a device configured to selectively cause the barrier to move between a first position in which the barrier at least partially extends from the compartment to establish the partition and a second position in which the barrier is situated inside the compartment.

2. The apparatus of claim 1, wherein the filter layer meets the U.S. National Institute for Occupational Safety and Health (NIOSH) N95 standard of air filtration.

3. The apparatus of claim 1, wherein the barrier is retractable from the first position into the second position.

4. The apparatus of claim 1, wherein the barrier is configured to create at least one compartment in a vehicle having at least one seat.

5. The apparatus of claim 1, wherein the barrier is configured to separate a first zone in a vehicle from a second zone in the vehicle.

6. The apparatus of claim 1, wherein the barrier is located in one of an automobile, a bus, a train, and an airplane.

7. The apparatus of claim 1, wherein the barrier is located between a first seat and a second seat.

8. The apparatus of claim 1, wherein the filter layer is replaceable.

9. The apparatus of claim 1, wherein the barrier, the compartment and the device are all portable.

10. The apparatus of claim 1, wherein the barrier attaches to at least one fastener to remain in the first position.

11. The apparatus of claim 10, wherein the barrier automatically attaches to the at least one fastener.

12. The apparatus of claim 10, wherein the barrier is configured to automatically detach from the at least one fastener.

13. The apparatus of claim 10, wherein the barrier attaches to the at least one fastener in response to a request from a computing device.

14. The apparatus of claim 10, wherein the barrier attaches to the at least one fastener in response to a press of a button displayed by a computing device.

15. The apparatus of claim 1, wherein the barrier is portable and configured to be transported by a user and self-installed using at least one fastener on a ceiling of a vehicle to create at least one partition in the vehicle.

16. The apparatus of claim 1, wherein the barrier is portable and configured to be transported by a user and self-installed using at least one fastener on a floor of a vehicle to establish at least one partition in the vehicle.

17. The apparatus of claim 1, wherein the barrier is portable and configured to be transported by a user and self-installed to at least one fastener on an armrest of an airplane to create at least one partition in the airplane.

18. A method comprising:
   receiving, by at least one processor, a first request to extend a barrier from a first position within a compartment to a second position in which the barrier extends at least partially outside of the compartment;
   extending the barrier from the first position to the second position in response to the first request to establish a partition that at least partially separates an individual on a first side of the barrier from another individual on a second, opposite side of the barrier;
   receiving, by the at least one processor, a second request to retract the barrier from the second position to the first position; and
   retracting the barrier from the second position to the first position in response to the second request.

19. The method of claim 18, wherein the barrier attaches to at least one fastener when in the second position.

20. A non-transitory computer-readable storage medium, having instructions stored thereon that, when executed by a computing device causes the computing device to perform operations, the operations comprising:
   receiving a first request to extend a barrier from a first position within a compartment to a second position in which the barrier extends at least partially outside of the compartment;
   extending the barrier from the first position to the second position in response to the first request to establish a partition that at least partially separates an individual on a first side of the barrier from another individual on a second, opposite side of the barrier;
   receiving a second request to retract the barrier from the second position to the first position; and
   retracting the barrier from the second position to the first position in response to the second request.

21. The non-transitory computer-readable storage medium of claim 20, wherein the barrier attaches to at least one fastener when in the second position.

\* \* \* \* \*